United States Patent [19]
Ueno et al.

[11] Patent Number: 5,609,094
[45] Date of Patent: Mar. 11, 1997

[54] APPARATUS FOR WINDING-UP CROISSANT DOUGH PIECES

[75] Inventors: Sadao Ueno; Michio Morikawa, both of Tochigi-ken, Japan

[73] Assignee: Rheon Automatic Machinery Co., Ltd., Tochigi-ken, Japan

[21] Appl. No.: 405,282

[22] Filed: Mar. 16, 1995

[30]     Foreign Application Priority Data

Mar. 23, 1994  [JP]  Japan ................................. 6-078175

[51] Int. Cl.$^6$ ................. A21C 3/06; A21C 11/00; A21C 1/00; A21D 6/00
[52] U.S. Cl. ................. 99/450.2; 99/353; 99/450.1; 425/92; 425/321; 425/325; 425/335
[58] Field of Search .............. 99/353, 450.1–450.8, 99/494; 414/783; 425/321, 322, 325, 329, 335, 391, 92, 115; 426/500–502, 512, 231; 198/456, 379, 468.3

[56]          References Cited

U.S. PATENT DOCUMENTS

| 4,905,583 | 3/1990 | Hayashi | 99/450.2 |
| 4,994,293 | 8/1990 | Hayashi | 426/501 |
| 4,996,915 | 3/1991 | Morikawa et al. | 99/450.2 |
| 5,078,585 | 1/1992 | Morikawa et al. | 425/321 X |
| 5,142,631 | 5/1992 | Ueno et al. | 414/783 X |
| 5,169,664 | 9/1992 | Ueno et al. | 198/379 X |
| 5,219,592 | 6/1993 | Hirabayashi et al. | 425/383 |
| 5,281,120 | 1/1994 | Morikawa et al. | 425/115 |
| 5,382,154 | 1/1995 | Morikawa et al. | 425/321 |
| 5,421,714 | 6/1995 | Morikawa et al. | 426/500 X |
| 5,440,974 | 8/1995 | Ueno et al. | 99/450.2 |
| 5,460,081 | 10/1995 | Ueno et al. | 99/353 X |
| 5,516,538 | 5/1996 | Ueno et al. | 426/231 |

*Primary Examiner*—Timothy F. Simone
*Attorney, Agent, or Firm*—Limbach & Limbach

[57]          ABSTRACT

An apparatus for winding-up croissant dough pieces is provided. It comprises a conveyor, a pair of pressing boards, and a spacing means having a dough-piece detecting means. By the apparatus a triangular croissant dough piece is fed between the conveyor and the pair of pressing boards and wound up, while each of the pressing boards is moved outwardly of the conveyor by the spacing means, thereby lengthening both ends of a dough roll being wound to shape a long and slender croissant dough roll. After shaping it, the pressing boards are caused to approach each other. The dough-piece detecting means is effective in synchronizing the actuation of the pressing boards with the winding-up operation, so that a wound dough roll is precisely lengthened in its axial direction.

3 Claims, 3 Drawing Sheets

APPARATUS FOR WINDING-UP CROISSANT DOUGH PIECES

BACKGROUND OF THE INVENTION

1. Field of the Invention

This invention relates to an apparatus for winding up croissant dough pieces. It particularly relates to an apparatus that can wind up a triangular dough piece to produce a long and slender croissant dough roll of a shape that resembles that of a hand-rolled croissant dough roll.

2. Prior Art

A croissant roll, both ends of which are bent inward, is preferred by consumers. To prepare this C-shaped croissant roll various methods have been provided. For instance, a triangular dough piece is manually wound up so as to shape a slender and wound dough piece, both ends are manually or automatically bent inward, and it is baked to make the croissant roll. Also, a triangular dough piece is wound up by means of a winding-up apparatus to make a croissant dough roll, and both ends are manually or automaticaly bent inward to make a croissant dough roll. It is then baked to make the croissant roll.

Also, various kinds of apparatuses for winding up croissant dough pieces have previously been provided. For instance, International Patent Publication No. WO 86/02808 discloses a pastry-rolling machine.

In FIG. 1 of the above Patent Publication each of a pair of rigid laths (21,21) is mounted on one end of each of a pair of brackets (22, 22). The other end of each of the brackets (22, 22) is hinged about a transverse horizontal axis (23) disposed above a conveyor (1). The pair of laths (21,21) can swing vertically about the axis (23). Therefore, the pair of laths (21,21) can rise in response to the increasing height of a croissant dough roll (2') that is being wound up, during a winding-up operation. When the croissant dough roll (2') is formed, the pair of laths (21,21) apply a stretching force due to their own weight and the weights of the brackets (22,22) to stretch and lengthen the croissant dough roll (2').

However, the space between the laths (21,21) is fixed. Therefore, they prevent both ends of the croissant dough roll (2') from being lengthened. Thus, as shown in FIG. 2 of the prior art, the length of the croissant dough roll (2') is almost the same as the length of the base of a triangular croissant dough piece (2). Also, the dough roll (2') has a fat shape, and its length is relatively short, like a croissant dough roll 17 of FIG. 7 attached to this specification. Therefore to meet consumer requirements, a further manual stretching and lengthening of this dough roll has been necessitated. In any event, it has been difficult to produce long and slender croissant dough rolls.

SUMMARY OF THE INVENTION

One object of the present invention is to provide an apparatus for winding up triangular dough pieces, thereby shaping long and slender croissant dough rolls. Another object is to provide an apparatus by which the configuration of the spindle-shaped central part of a croissant dough roll can be maintained, while being wound up.

By one aspect of this invention an apparatus for winding up croissant dough pieces is provided. It comprises a conveyor to convey croissant dough pieces downstream and a pair of pressing boards disposed symmetrically along the conveying direction of, and above, the conveyor, characterized in that each of the pair of pressing boards is adapted to move in a direction perpendicular to the conveying direction of the conveyor, the apparatus is provided with a spacing means to move each of the pair of pressing boards outwardly and inwardly of the conveyor, thereby progressively spacing the pressing boards apart from each other when a croissant dough piece is wound up and causing each said pressing board to approach each other after the winding-up operation, and characterized in that the spacing means is provided with a dough-piece detecting means to actuate the spacing means.

EXPLANATION OF THE PREFERRED EMBODIMENTS

A first embodiment of the apparatus of this invention will now be explained by reference to the drawings.

Figure 1:
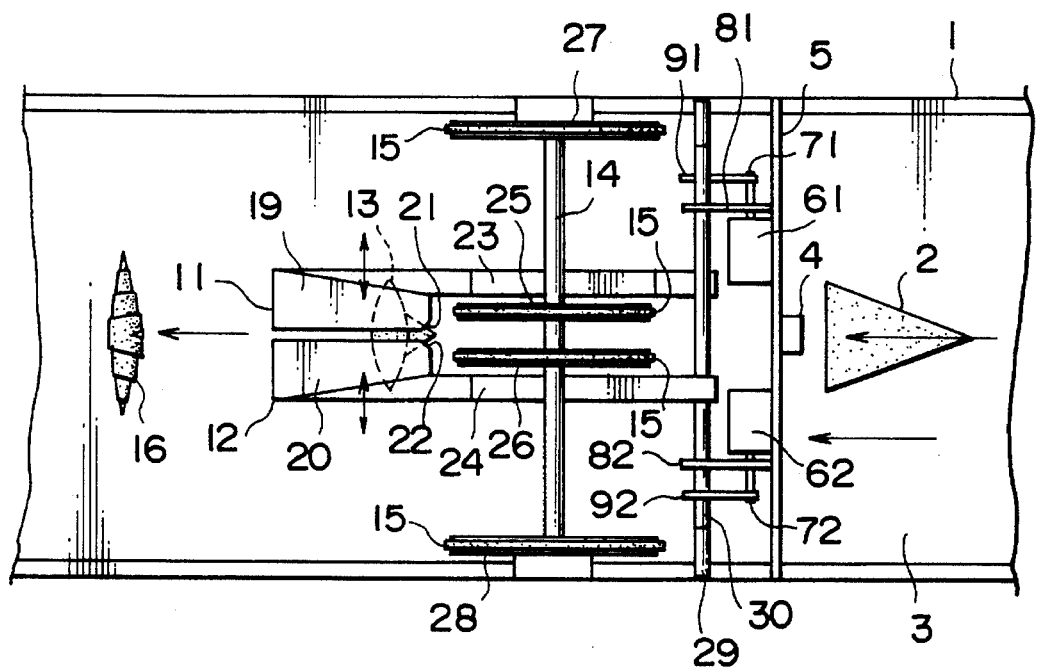
FIG. 1 is a schematic plan view of a first embodiment of this invention.
Figure 2:
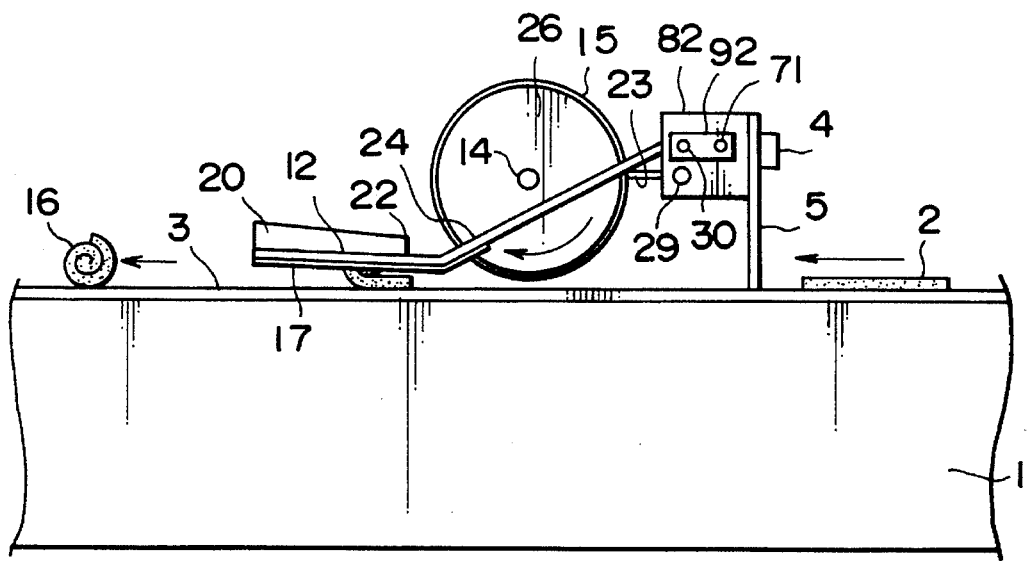
FIG. 2 is a schematic side view of the first embodiment of this invention.

As shown in FIGS. 1 and 2, a conveyor 1 is disposed. It is provided with a conveying belt 3, which is driven by means of a motor (not shown), and conveys a triangular croissant dough piece 2. A dough-piece detecting sensor 4 is mounted on a stand 5 mounted on the conveyor 1. The stand 5 is positioned to lie across and perpendicular to the conveying direction of the conveying belt 3.

For the dough-piece detecting sensor 4, a reflection-type color tone identifying sensor is used.

Air-cylinders 61 and 62 are mounted on the stand 5 such that rods 71 and 72 can reciprocate perpendicularly to the conveying direction of the conveying belt 3. These air-cylinders 61 and 62 are adapted such that the actuation starting time of each of the rods 71 and 72 is controllable by detecting signals from the dough-piece detecting sensor 4 through a timer (not shown) disposed in a controller (not shown).

The stand 5 is provided with a pair of brackets 81 and 82 such that each bracket is positioned opposite and symmetrical to the other. The rods 71 and 72 of the air-cylinders 61 and 62 are adapted to extend through brackets 81 and 82, respectively. Shafts 29 and 30 are disposed to be held by the brackets 81 and 82 such that they are positioned vertically and parallel to each other and are slidable through the brackets 81 and 82.

To the free end of the rod 71 one of the two ends of an arm 91 is fixedly mounted, and at the other end of the arm 91 the shaft 29 is rotatably mounted. Similarly, to the free end of the rod 72 one of the two ends of an arm 92 is fixedly mounted, and at the other end of the arm 92 the shaft 30 is rotatably mounted.

The shafts 29 and 30 are adapted to reciprocate symmetrically in relation to each other by means of the arms 91 and 92. The arms 91 and 92 are moved by the reciprocating movements of the rods 71 and 72, respectively.

Figure 3:
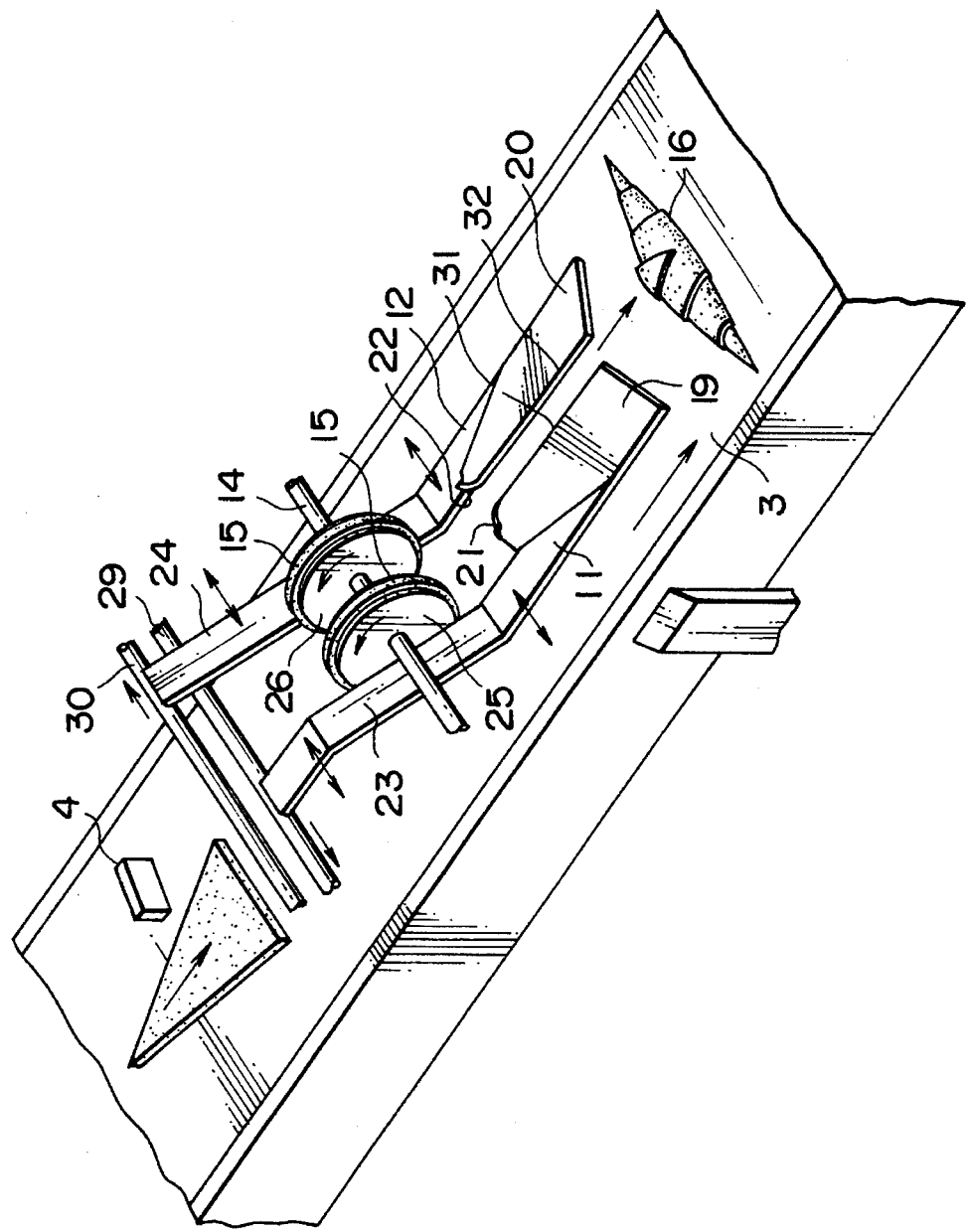
FIG. 3 is a schematic and perspective partial view of the first embodiment of this invention.

As shown in FIG. 3, a pair of pressing boards 11 and 12 is disposed over the conveyor 1. The pressing board 11 comprises a pressing part 19 that is parallel to the conveying belt 3, and a support part 23 that is inclined, the free end of which is connected to the shaft 29. The pressing board 12 also comprises a pressing part 20 and a support part 24, which is also inclined, the free end of which is connected to the shaft 30. The pressing boards 11 and 12 are spaced apart from each other to provide a set distance.

The pressing parts 19 and 20 are shaped such that they are made to incline so that the inner edge (31 or 32) of each of the pressing boards is most spaced apart from the conveying belt 3.

As shown in FIG. 2, the roughened rubber belts 17 and 17 are provided to adhere to the undersides of the downstream parts of the support parts 23 and 24, and to the undersides of the pressing boards 11 and 12 (in FIG. 3 these rubber belts 17 and 17 are omitted).

The conveying belt 3 is also provided with a roughened rubber belt having a high coefficient of friction. It is to avoid the croissant dough piece 2 from slipping on the surface of the belt 3.

In FIGS. 1, 2, and 3 a pair of holding rollers 25 and 26 is disposed between the support parts 23 and 24, and upstream of the pressing parts 19 and 20. The rollers 25 and 26 are parallel to the support parts 23 and 24, respectively, and are spaced apart from the conveying surface so as to hold the croissant dough piece 2 against the conveying surface.

The diameter of each of the rollers 25 and 26 is determined so that the vertical movements of the support parts 23 and 24 due to the passing of the croissant dough pieces 2 do not affect a drive shaft 14. The rollers 25 and 26 are fixedly mounted on this drive shaft 14. A pair of driven rollers 27 and 28 is also fixedly mounted on the drive shaft 14. The rollers 27 and 28 are adapted to rotate by a frictional engagement with the conveying belt 3. Therefore, the rollers 25 and 26 are forcibly rotated.

A rubber belt 15 is tightly stretched around the periphery of each of the holding rollers 25 and 26 and the driven rollers 27 and 28.

As shown in FIG. 1, the triangular croissant dough piece 2 that is cut and shaped by any known process is conveyed so that the base of the triangle is directed downstream and positioned perpendicularly to the conveying direction of the conveying belt 3. The dough-piece detecting sensor 4 senses the passing of the triangular croissant dough piece 2. Its base is kept perpendicular to the advancing direction. Thus, the triangular croissant dough piece 2 is fed under the pressing boards 10 and 11, while its direction is kept stable.

The detected triangular croissant dough piece 2 is conveyed further downstream, and pressed by the holding rollers 25 and 26 against the belt 3.

A time that runs from the detection of the dough piece 2 to the start of the actuation of the pressing boards 11 and 12 is set in the timer of the controller. Therefore, after the set time has elapsed, a signal transmitted from the controller causes the respective motors (not shown) for the air-cylinders 61 and 62 to actuate. Thus, the rods 71 and 72 of the air-cylinders 61 and 62 cause the arms 91 and 92 to move laterally of the conveyor 1, and in turn to move the shafts 29 and 30. Then, the pressing boards 11 and 12 are also moved outwardly and laterally of the conveyor 1.

As shown in FIG. 2 and as previously stated, the roughened rubber belts 17 and 17 are provided to adhere to the undersides of the downstream parts of the support parts 23 and 24, and to the undersides of the pressing boards 11 and 12. Therefore, these undersides contact the croissant dough piece 2. Thus, first, both ends of the base of the triangular croissant dough piece 2 contact the downstream parts of the support parts 23 and 24, and as shown in FIG. 2, they are caused to begin to curl, thereby making a core for winding up the triangular croissant dough piece 2.

The triangular croissant dough piece 2 is further conveyed by the conveying belt 3 and fed under the pressing boards 11 and 12, while it is wound up to become a wound dough roll. Namely, as shown FIG. 1, a croissant dough roll 13, as shown by imaginary dotted lines, is shaped. The peak of the triangular croissant dough piece 2, namely, the wound-dough end of it and a part of the dough roll 13, can be seen between the pressing parts 19 and 20. The length of the dough roll 13 is almost the same as, or rather somewhat less than, that of the length of the base of the triangular croissant dough piece 2.

After each of the pressing parts 19 and 20 has moved outwardly from the conveyor 1 by a set distance to lengthen the croissant dough roll 16, they are caused to approach each other. Thus, one cycle, to prepare one croissant dough roll, ends. After this, the winding-up operation continues based on the program memorized in the controller.

Figure 6:
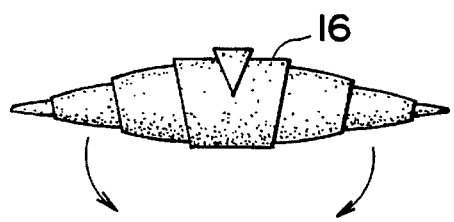
FIG. 6 shows a shaped croissant dough roll prepared by the embodiment of this invention.
Figure 7:
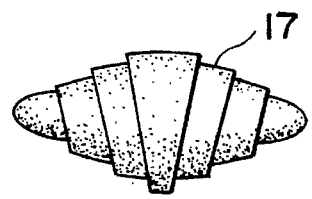
FIG. 7 shows a shaped croissant dough roll prepared by the prior-art apparatus.

The length of the croissant dough roll 16 is longer than that of the base of the triangular croissant dough piece 2. As shown by two arrows in FIG. 6, both ends of the croissant dough roll 16 are then manually bent inwardly.

As shown in FIG. 3, the pressing parts 19 and 20 are inclined such that each of their faces facing the belt 3, together with the face of the belt, provide a space between the face of the pressing parts 19 and 20 and the face of the belt 3. Namely, the inner edges 31 and 32 of each pressing board are most spaced apart from the conveying belt 3. Therefore, the face of each pressing part 19 and 20 contacts and holds the surface of the expanded part of a croissant dough roll 16 that is being wound, while each pressing part 19 and 20 is moved outwardly of the conveying belt 3. Thus, the spindle-shaped croissant dough roll 16 is smoothly formed, while both ends of the croissant dough roll are elongated.

The inclinations of the pressing parts can be adjusted to meet the requirements to wind up the triangular dough pieces. Also, the downstream end of the inner edge of each pressing board may be most spaced apart from the conveying belt 3 as compared with the upstream end of the inner edge of each pressing board.

As shown in FIGS. 1 and 3, in this embodiment, to have dough pieces smoothly advance under the pressing parts 19 and 20, the upstream ends 21 and 22 of the inner edges 31 and 32 are bent upwardly, respectively. This prevents the dough pieces from adhering to the upstream ends of the pressing parts 19 and 20, so as to avoid being damaged.

In this embodiment, when the croissant dough piece 2 is being wound up, simultaneously the pressing boards 11 and 12 are actuated to be spaced apart from each other in a direction perpendicular to the conveying direction. However, changing the time that elapses from the time of the detection of the dough piece 2 by the dough-piece detecting sensor 4 to the start of the actuation of the pressing boards will adjust the length of the croissant dough piece 2 when it is wound up.

The lateral moving speeds of the pressing boards 11 and 12 and the lengths of the pressing parts 19 and 20 in the conveying direction can be changed, so that the length of a croissant dough roll can be adjusted.

To efectively hold the croissant dough piece 2, the rubber belt 15 is tightly stretched around the periphery of each of the holding rollers 25 and 26. However, in place of the roller, a rubber belt having a round cross section can be used such that it is stretched parallel to the conveying face, so as to hold the croissant dough piece 2, with the same effects as are obtained by the roller.

Figure 4:
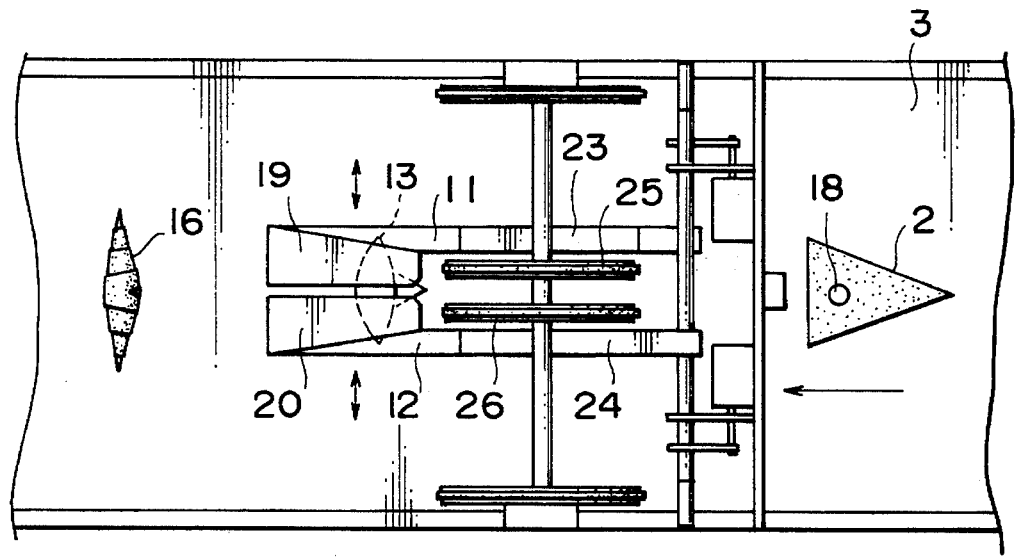
FIG. 4 is a schematic plan view of a second embodiment of this invention.
Figure 5:
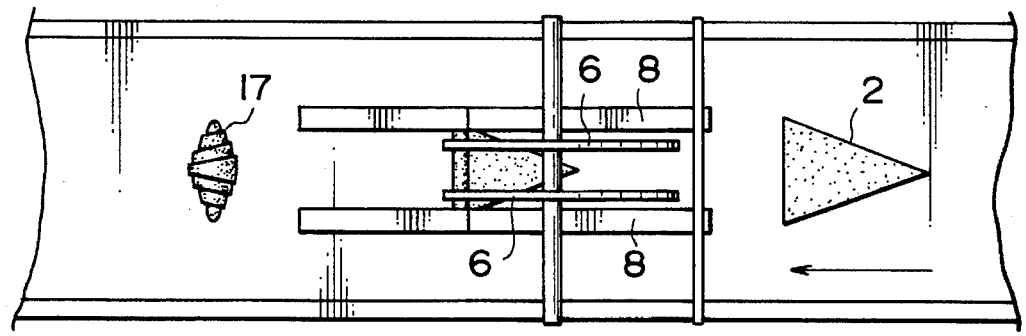
FIG. 5 is a schematic plan view of the prior-art apparatus.

A second embodiment of the apparatus of this invention will now be explained by reference to FIG. 4.

The apparatus used in this embodiment is almost the same as that used in the first embodiment. However, a filling 18 is placed on the triangular croissant dough piece 2 at a prior stage. Therefore, the space between the holding rollers 25 and 26 is designed so as to be wider than the width of the filling 18. Thus, the holding rollers 25 and 26 can hold the croissant dough piece 2, without contacting the filling 18. Therefore, the croissant dough piece 2 can be stably conveyed under the pressing boards 11 and 12.

The winding up of the croissant dough piece 2 by the pressing boards 11 and 12 starts from both ends of its base. Therefore, the curling up of the croissant dough piece 2 also starts from both ends of the base. Thus, the filling 18 is enveloped by the curled-up dough, and a dough roll 13 that contains the filling 18 is shaped. This dough roll 13 is lengthened in a direction perpendicular to the conveying direction. Thereby a croissant dough roll 16 is prepared.

As explained above, a triangular croissant dough piece is detected by the dough-piece detecting sensor, and wound up by the pair of pressing boards, along the conveying direction. In this process the pressing boards are spaced apart from each other in a direction perpendicular to the conveying direction. Therefore, the croissant dough piece can be shaped in a lengthened form.

Thus, after shaping the lengthened dough piece, a well-proportioned croissant dough piece can be made by bending both ends of the lengthened dough piece, either manually or automatically.

Also, the pair of pressing boards is made to incline so that their faces facing the belt, and the belt, provide gradually increasing spaces between the faces and the belt. Therefore, the shape of an expanded, at the central part, and spindle-shaped, dough piece, which is the characteristic shape of a croissant, can be maintained, while being wound up.

Also, even when a croissant dough piece on which a filling is placed is wound up, it can be shaped without the filling overflowing it.

What is claimed is:

1. An apparatus for winding up croissant dough pieces comprising a conveyor to convey croissant dough pieces downstream and a pair of pressing boards disposed symmetrically along the conveying direction of, and above, said conveyor, characterized in that:

each of said pair of pressing boards is adapted to move in a direction perpendicular to said conveying direction of said conveyor, said apparatus is provided with a spacing means to move each of said pair of pressing boards outwardly and inwardly of said conveyor, thereby progressively spacing each pressing board apart from each other when a croissant dough piece is being wound up and causing each said pressing board to approach each other after the winding-up operation, and said spacing means is provided with a dough-piece detecting means to actuate said spacing means.

2. The apparatus of claim 1, wherein said pair of pressing boards are inclined so that the inner edge of each pressing board is most spaced apart from said conveyor.

3. The apparatus of claim 1 or 2, wherein said apparatus is provided with a dough-piece holding means disposed upstream of and adjacent said pair of pressing boards.

* * * * *